Patented Aug. 23, 1949

2,480,007

UNITED STATES PATENT OFFICE 2,480,007

TREATMENT OF CHLORINATED POLYTHENE

David Adams Fletcher, Pompton Plains, N. J., assignor to E. I. du Pont de Nemours & Company, Wilmington, Del., a corporation of Delaware No Drawing. Application July 25, 1946, Serial No. 686,148

4 Claims. (Cl. 260—41)

This invention relates to the treatment of chlorinated polythene and, more particularly, to a rapid and economical method of treating chlorinated polythene to reduce its solubility and thermoplasticity at elevated temperatures.

The polymers of ethylene which are solids at normal temperatures are disclosed and claimed in Fawcett et al. U. S. Patent 2,153,553 and are now known as polythene. Chlorinated polythene is known in the prior art and the preparation of this product is disclosed in Fawcett U. S. Patent 2,183,556 and in application Serial No. 686,149, filed July 25, 1946, in the name of Robert S. Taylor and entitled "Aqueous suspension chlorination of polythene." Usually these chlorinated polythenes are prepared by chlorinating polythene having a molecular weight above 2000. Useful chlorinated polythene may have a chlorine content ranging from 4% to 80% by weight although those having a chlorine content of 20% to 35% are more generally employed in commercial applications.

Chlorinated polythene as normally prepared today without any special treatment after preparation is substantially entirely soluble in a number of organic solvents. In order to be definite, the solubility of the polymer in boiling trichloroethylene will be referred to herein, that is, "soluble chlorinated polythene" as used herein denotes chlorinated polythene which is soluble in boiling trichloroethylene. The ordinary chlorinated polythene prepared today is "soluble."

Chlorinated polythene has many potential uses in the manufacture of flexible sheets, films, coatings and the like. However, it fuses and becomes tacky when subjected to elevated temperatures in the neighborhood of 130° C., and this behavior is objectionable in certain applications. Methods are known of decreasing the solubility and reducing the thermoplasticity at elevated temperatures of chlorinated polythene, one method being disclosed in Fawcett U. S. Patent 2,261,757. However, the process disclosed in this patent involves treating the chlorinated polythene in solution which is an obviously uneconomical and awkward procedure as compared to treating the chlorinated polythene in the dry state.

An object of the present invention is to improve the physical properties of chlorinated polythene compositions, particularly at elevated temperatures. A further object is to provide a rapid and economical process of increasing the ability of these compositions to withstand high service temperatures without fusing or becoming tacky. Other objects will be apparent from the description of the invention given hereinafter.

The above objects are accomplished according to the present invention by heating soluble chlorinated polythene in the dry state in the presence of an iron salt soluble in organic solvents until at least 55% of the chlorinated polythene is insoluble in boiling trichloroethylene. Preferably, the chlorinated polythene is blended with 0.1%–5.0%, by weight of the chlorinated polythene, of the iron salt, calculated as ferric chloride, to give a dry uniform mixture and the mixture heated at 110° C. to 180° C. until the desired extent of insolubilization has taken place. More specifically, the mixture may be heated at 140° C. to 170° C. from 5 to 60 minutes and this heating may be carried out either during the course of blending the chlorinated polythene and iron salt, after the two are blended, or partly during the blending and partly thereafter.

While the heating step in the process could be carried out with the chlorinated polythene in solution to reduce the solubility of the polymer, an outstanding advantage of the invention is that the polythene may be in the dry state during the heating so that there is no necessity of going to the trouble and expense of working with a solution. Hence, in its more useful form, the chlorinated polythene is heated in the dry state, that is, it is neither dissolved in a liquid solvent nor suspended in a liquid medium although the use of a solvent to facilitate blending is by no means precluded.

In the practice of this invention the iron salt is mixed with the chlorinated polythene, either alone or, if desired, with other ingredients such as solvents, lubricants, softeners, plasticizers, fillers, pigments, stabilizers and minor proportions of other synthetic or natural resins. The components of the chlorinated polythene composition may be mixed by rolling, in a Banbury or any other conventional mixing equipment or, if for some reason it should be practical to do so under any particular circumstances, the components may be dissolved in a mutual solvent until a uniform blend is obtained, and the solvent subsequently evaporated. In certain applications it may be desirable to treat an article made of chlorinated polythene or one having a coating of chlorinated polythene with a solution of iron salt, followed by evaporation to leave a portion of the iron salt on the surface of the article. The precise method of mixing is, however, not critical in the practice of this invention.

The chlorinated polythene blended with an iron salt must be subjected to a heat treatment sufficient to reduce the solubility of the polymer. The exact method of heat treatment is likewise not critical provided the temperature is sufficiently high to reduce the solubility of the polymer to at most 45% in boiling trichloroethylene. Usually, the compositions are heated to a temperature of 110° C.–180° C. for a short time. The blended compositions may be converted by milling on heated rolls, by pressing between hot platens, by molding, by calendering with a heated metal surface, or simply by heating the composition in an air oven or passing it continuously through a heated oven or tube.

The following examples, in which all proportions are by weight unless otherwise specified, illustrate specific embodiments of the invention.

EXAMPLE I 100 parts of chlorinated polythene (27% chlorine) were rolled at 138° C. with 4 parts of ferric chloride for 10 minutes. The resulting composition was not tacky at 130° C. and contained 83% insoluble matter after a 16 hour extraction with boiling trichloroethylene using a Soxhlet extractor. An equivalent sample of chlorinated polythene containing no ferric chloride began to fuse after 30 minutes at 130° C. and was completely soluble in boiling trichloroethylene after a 16 hour extraction.

In this example the blending of the chlorinated polythene with the ferric chloride and the heat treatment of the composition proceeded simultaneously.

EXAMPLE II 100 parts of chlorinated polythene (27% chlorine) were rolled at 138° C. for 20 minutes with 1 part of ferric chloride. The composition was sheeted out into slabs 0.080" in thickness which slabs were then compression molded by heating for 5 minutes at 149° C. The table shows the improved properties of this heat treated composition (A) over that of a control sample (B) containing no ferric chloride.

Table

|  | A | B |
|---|---|---|
| Tensile strength, lbs./sq. in | 1,920 | 1,850 |
| Elongation, per cent | 280 | 610 |
| Rupture Temperature, ° C | above 225 | 112 |
| Per cent insoluble in boiling trichloroethylene (16 hours extraction) | 55.5 | 0 |
| Per cent deformation (Williams Plastometer) | 1.5 | 15.1 |

The tensile strength and elongation tests were made according to A. S. T. M. D–412–41 using a die C. The rupture temperature tests was conducted on a heat treated sheet 60 mils thick by placing a four pound weight supported on three rounded ($\frac{3}{16}$" diameter) prongs one inch apart on the sheet and gradually increasing the temperature. In the deformation test the sample was preheated for 6 minutes without a load and then heated for 5 minutes under a load of 11 lbs./sq. in., the whole plastometer being in an oven uniformly heated at 110° C.

In this example it will be apparent that the composition was subjected to heat treatment both during the blending while the composition was being rolled and also during the compression molding.

EXAMPLE III 100 parts of chlorinated polythene (27% chlorine) were rolled at 149° C. for 10 minutes with 1 part of ferric stearate. The resulting composition was not tacky at 130° C. while a similarly processed sample of chlorinated polythene containing no ferric stearate became tacky after 30 minutes at 130° C.

It will be understood the above examples are merely illustrative and that the present invention broadly comprises treating soluble chlorinated polythene by heating it in the presence of an iron salt soluble in organic solvents until at least 55% of the chlorinated polythene is insoluble in boiling trichloroethylene. Obviously, the invention is applicable only to chlorinated polythene of the soluble type as its utility would be substantially nil as applied to chlorinated polythene already insolubilized; further, the invention is applicable only to pre-existing chlorinated polythene and does not contemplate a treatment in the process of forming the chlorinated polythene.

The present invention resides primarily in the discovery of what apparently is a very specific behavior of certain iron salts with respect to chlorinated polythene. While no entirely satisfactory explanation presents itself, it has been discovered through actual experimental work that these iron salts do not have the same effect on some vinyl chloride interpolymers and it seems fair to assume they do not have this effect on any other polymers commercially available at present although it is a possibility their effect on isolated polymers of more or less non-analogous charater might be roughly equivalent. Again, other metal salts such as aluminum chloride, zinc chloride, and stannic chloride which could be expected to behave similarly to iron salts with respect to chlorinated polythene, are not equivalent at all. In fact, no metal salts are known which have anything approaching the rapid insolubilizing action of these iron salts on chlorinated polythene in the dry state.

The iron salts operative in the present invention are those soluble in organic solvents such as alcohol and ether. Iron itself and ferric oxide are almost totally ineffective in the present process which seems to be due to their insolubility in organic solvents. It will be understood that organic solvents, at least in any quantity, are desirably not used in the present invention, it simply having been determined that it is only the iron salts which are characterized by being soluble in organic solvents, that are operative in the present invention.

While the ferric chloride and ferric stearate shown in the examples are particularly suitable for use in the present invention other iron salts soluble in organic solvents may be used such as ferrous thiosulfate, ferrous iodide, ferric thiocyanate, iron carbonyls, and basic iron acetate. The quantity of iron salt used in the present invention should lie between 0.1% and 5.0%, by weight of the chlorinated polythene, when calculated as ferric chloride. If an iron salt other than ferric chloride is to be used, it should be used in a molecular equivalent amount equal to 0.1%–5.0%, by weight of the chlorinated polythene, of ferric chloride. For practical applications it is normally desirable to choose as little of the iron salt as possible because amounts in excess of 5% do not materially enhance the properties of the composition but rather seem to yield unstable polymers which liberate hydrogen chloride when subjected to elevated temperatures. On the other hand, less than 0.1% produces practically no insoluble matter within a reasonable heat treating cycle. From 1% to 2%, calculated as ferric chloride, has proved to be an optimum amount in most instances. A mixture of two or more iron salts may be used just as well as a single iron salt if desired.

It will be apparent from the examples and the foregoing discussion that the present invention contemplates considerable latitude in the heating of the chlorinated polythene. Ordinarily, the iron salt will be blended with the chlorinated polythene to obtain a uniform mixture but the invention may be carried out by applying a solution of the iron salt in alcohol or the like to the chlorinated polythene, evaporating the solvent to leave a residue on the surface, and then heating the chlorinated polythene. Clearly, such a procedure would largely be applicable where it was only necessary to insolubilize the surface of the chlorinated polythene.

Any heating of the chlorinated polythene sufficient to convert at least 55% of the chlorinated polythene to insoluble form comes within the present invention. Although a lower temperature could be used if there were no objection, it is hardly practical to heat to a temperature less than 110° C. nor is any advantage to be gained by exceeding 180° C. even though a higher temperature might be used if due care were exercised. It is preferred to heat to a temperature between 140° C. and 170° C. for 5 to 60 minutes, the time being somewhat greater where a temperature in the lower part of the range is used. Clearly, the extent of the heat treatment will be governed by the extent of insolubilization desired and, as previously mentioned, the heat treatment need not be continuous.

There are numerous practical advantages in the present invention. Thus, while the fusion and tack temperatures and solvent resistance at elevated temperatures may be substantially increased and the deformation under load at elevated temperatures substantially decreased by the economical process described, that is, with cheap modifiers combined with a rapid heat treating cycle, other desirable properties of the treated chlorinated polythene compositions are substantially unaffected, namely, the flexibility at elevated temperatures, the tensile strength, and certain electrical properties such as the power factor, dielectric constant, and volume resistivity. Accordingly, the chlorinated polythene compositions after treatment according to the present invention, may be used in the form of sheets, films, filaments, coatings and various molded, impregnated and laminated structures to make gaskets, diaphragms, packing, grommets, bottle stoppers, primary wire insulation, jacketing material over other electrical insulation, electrical insulating tape, electrical waxes, belts, rattan, monofilaments and yarns, tobacco pouches, wallets, handbags, luggage covering, furniture upholstery, floor and wall covering, and the like.

As many apparently widely different embodiments of this invention may be made without departing from the spirit and scope thereof, it is to be understood that the invention is not limited to the specific embodiments thereof except as defined in the appended claims.

I claim:

1. Process of treating soluble chlorinated solid polythene which comprises mixing said chlorinated polythene with 0.1%–5.0%, by weight of said chlorinated polythene, of an iron salt soluble in organic solvents, calculated as ferric chloride, to obtain a dry, uniform mixture and heating said mixture at 110° C.–180° C. until at least 55% of said chlorinated polythene is insoluble in boiling trichloroethylene.

2. Process of treating soluble chlorinated solid polythene which comprises mixing said chlorinated polythene with 0.1%–5.0%, by weight of said chlorinated polythene, of ferric chloride to obtain a dry, uniform mixture and heating said mixture at 110° C.–180° C. until at least 55% of said chlorinated polythene is insoluble in boiling trichloroethylene.

3. Process of treating soluble chlorinated solid polythene which comprises mixing said chlorinated polythene with 1.0%–2.0%, by weight of said chlorinated polythene, of an iron salt soluble in organic solvents, calculated as ferric chloride, to obtain a dry, uniform mixture and heating said mixture at 140° C.–170° C. until at least 55% of said chlorinated polythene is insoluble in boiling trichloroethylene.

4. Process of treating soluble chlorinated solid polythene which comprises mixing said chlorinated polythene with 1.0%–2.0%, by weight of said chlorinated polythene, of ferric chloride to obtain a dry, uniform mixture and heating said mixture at 140° C.–170° C. until at least 55% of said chlorinated polythene is insoluble in boiling trichloroethylene.

DAVID ADAMS FLETCHER.

REFERENCES CITED

The following references are of record in the file of this patent:

UNITED STATES PATENTS

| Number | Name | Date |
|---|---|---|
| 2,060,035 | Chaney | Nov. 10, 1936 |
| 2,157,997 | Brons | May 9, 1939 |
| 2,261,757 | Fawcett | Nov. 4, 1941 |

OTHER REFERENCES

Hahn et al., Ind. Eng. Chem., 37, 526 (June 1945).